Aug. 11, 1931.  G. YULL  1,818,185
INDICATOR FOR STORAGE BATTERIES
Filed April 18, 1927
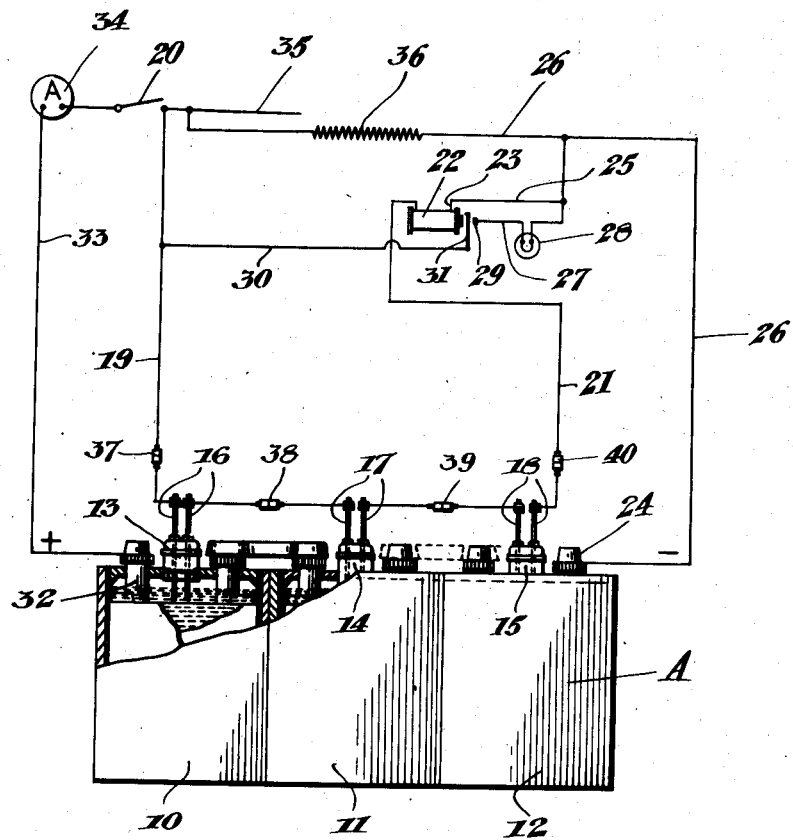
INVENTOR.
GORDON YULL
BY *Featherstonhaugh & Co.*
ATT'YS.

Patented Aug. 11, 1931

1,818,185

UNITED STATES PATENT OFFICE

GORDON YULL, OF SUDBURY, ONTARIO, CANADA

INDICATOR FOR STORAGE BATTERIES

Application filed April 18, 1927. Serial No. 184,814.

This invention relates to improvements in indicators for storage batteries and more particularly to means for indicating the level of the electrolyte, and the object of the invention is to provide a device of this description for use in connection with automobile batteries to warn the driver of the vehicle that one or more of the cells require water.

In carrying out the invention the vent plugs are fitted with lead electrodes and connected in series, an electrode of one plug being connected to the ignition switch and an electrode of another plug to an electro-magnet, the circuit being completed by connecting the other terminal of the magnet to the negative pole of the battery or ground whereby the magnet is energized when the ignition switch is thrown in and whereby, on the level of the electrolyte falling below the points of the electrodes, the magnet becomes de-energized, permitting a warning to be given by the illumination of a lamp.

Referring now to the drawing, in which a diagrammatic view of the device is disclosed and in which like numerals of reference indicate corresponding parts, A designates the battery and B the diagrammatic view of the electric circuit.

The battery comprises the cells 10, 11 and 12, and vent plugs 13, 14 and 15, each of which is provided with two lead electrodes 16, 17 and 18 connected together in series, one electrode 16 of plug 13 being connected by the line 19 to the ignition switch 20, while one electrode 18 of plug 15 is connected by line 21 to one terminal of a small electromagnet 22, this circuit being completed by connecting the other terminal 23 of the electro-magnet 22 to the negative pole 24 of the battery through lines 25 and 26. Connected to the line 25 is a line 27 in which is a lamp 28 and contact point 29, while a line 30 connects the line 19 with an armature 31 between the electro-magnet 22 and the contact point 29. The positive pole 32 of the battery is connected by the line 33 to the ignition switch and has therein an ammeter 34.

It will also be noted that the line 26 from the negative pole 24 of the battery is connected to the ignition line 33 and has therein a resistance coil 36.

To allow for the removal of the vent plugs from the battery for filling and testing, I provide push and pull connections 37, 38, 39 and 40.

In operation, on the switch 20 being closed, a circuit is formed through line 19, battery A, line 21, energizing the electro-magnet 22, causing the armature 31 to engage therewith and away from the contact point 29. The lamp 28 is in series with the contact point 29, and the negative pole of the battery through the lines 26 and 27, while the armature 31 is connected to the line side 30 of the ignition switch 20. If, therefore, the level of the electrolyte in any of the cells of the battery falls below the points of the electrodes 16, 17 and 18, the magnet becomes de-energized, permitting the armature, under the influence of a spring, to engage with the contact point 29, closing the circuit though the line 27, lamp 28, line 26 to the negative pole 24, illuminating the lamp 28 and thereby giving warning to the driver.

As many changes could be made in the above construction, and many apparently widely different embodiments of my invention, within the scope of the claim, constructed without departing from the spirit or scope thereof, it is intended that all matter contained in the accompanying specification and drawing shall be interpreted as illustrative and not in a limiting sense.

What I claim as my invention is:

An indicator for storage batteries comprising in combination, a storage battery, a principal circuit deriving its current from the storage battery, a switch in said principal circuit, insulated, spaced apart, electrodes extending to a desired depth into the electrolyte in the battery, a second circuit in parallel with the principal circuit, said electrodes connected in series in said second circuit, an electro-magnet in series in said second circuit, the energizing of said second circuit controlled by the aforesaid switch, an armature operatively associated with the electromagnet, an alarm circuit in parallel with the second circuit and with the principal circuit, said armature in series in said alarm circuit, an alarm in series in said alarm circuit, the armature normally closing the alarm circuit when the electro-magnet is de-energized and operative to open the alarm circuit when the magnet is energized, the electrolyte in the battery forming part of the second circuit.

In witness whereof I have hereunto set my hand.

GORDON YULL.